Nov. 23, 1965　　　G. W. GALLOWAY　　　3,219,791
METHOD OF WELDING NON-FRAGMENTATION WARHEADS FOR
MISSILES, PARTICULARLY ANTIAIRCRAFT MISSILES
Filed Oct. 20, 1955

GEORGE W. GALLOWAY
INVENTOR.

BY

ATTORNEY

United States Patent Office 3,219,791
Patented Nov. 23, 1965

3,219,791
METHOD OF WELDING NON-FRAGMENTATION WARHEADS FOR MISSILES, PARTICULARLY ANTIAIRCRAFT MISSILES
George W. Galloway, Altadena, Calif., assignor, by mesne assignments, to the United States of America as represented by the Secretary of the Navy
Filed Oct. 20, 1955, Ser. No. 541,863
10 Claims. (Cl. 219—104)

This invention relates to a method of welding, and more particularly to a method of welding non-fragmentation warheads for antiaircraft missiles and the like.

It has been discovered that extremely effective warheads may be manufactured by welding a plurality of bars in zigzag series-connected relationship, the banks of welded bars then being mounted around an explosive charge in either cylindrical or semi-cylindrical shape. Upon detonation of the explosive within the bank or banks of bars, the zigzag welded bars stretch out into a substantially continuous hoop shape having a high lethality factor as compared to fragmentation type warheads. A better understanding of the type of warhead which the present welding method is adapted to produce may be had upon a reading of co-pending applications Serial No. 568,420, filed February 21, 1956, for Apparatus and Method for Assembling a Missile Warhead, which is assigned to the assignee of the present invention, and Serial No. 541,862, filed October 20, 1955, for Apparatus and Method for Positioning and Holding Bars During Welding Thereof Into Zigzag Series-Connected Relationship.

It will be appreciated that enormous forces and shock are applied to the welds between the bar ends upon detonation of the explosive, and which result in the great stretching out of the zigzag warhead into the relatively large diameter hoop adapted to cut structural members of aircraft to thus result in structural failure of the wing or fuselage. During such action, the bars which are originally substantially parallel and laterally adjacent each other are bent at points adjacent to the welds until they are largely longitudinal to each other. The welded joints must be able to withstand such bending of the bars, and resultant extremely high tensile and shear stresses, and may be referred to as "hinges" since the action which occurs at the welds is much in the nature of that which occurs in a hinge.

Not only must the welds produced be extremely strong, but the welding method must meet a number of other important requirements. In the first place, the welding method should be susceptible of relatively economical mass production, without the necessity of expensive forming or upsetting operations such as would be required if projection welding were employed. In addition, the welding method must be such as not to crush or distort the bars beyond predetermined close limits since such distortion would not only weaken the joint but would prevent the assembly from being shaped into the above-mentioned cylinders. Also, the welding method must be performed very rapidly and with a very small amount of flash and spatter in order to prevent the making of one weld from adversely affecting the bars disposed adjacent thereto and adapted to be welded subsequently. In the latter connection, sticking of one joint to the next, oxidation of metal at an unwelded joint, etc., must be avoided.

In view of the above factors characteristic of the welding of joints or hinges between bar or rod sections of a non-fragmentation warhead, it is an object of the present invention to provide a highly efficient and economical method of producing welds capable of withstanding the stresses created during detonation of the warhead explosive, said method producing a satisfactory weld in a very short period of time and without distortion or excessive flash and spatter.

A further object is to provide a method of welding the ends of bars together without crushing or distorting the same, such method being adapted to produce the necessary welds without resorting to the forming on the bar ends of upsets or projections such as would be required by projection welding.

A further object is to provide a method for welding together the bar ends of a pair of bars without adversely affecting the welded or unwelded bar pair ends disposed relatively close to those upon which the welding method is being performed.

These and other objects and advantages of the invention will be more fully set forth in the following specification and claims considered in connection with the attached drawing to which they relate.

Figure 4:
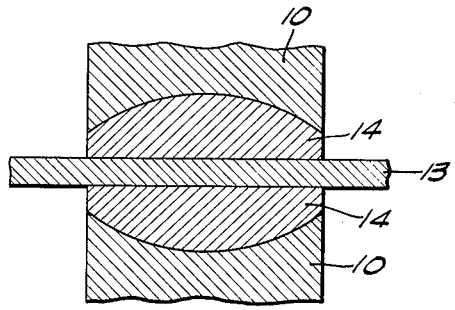
Figure 3:
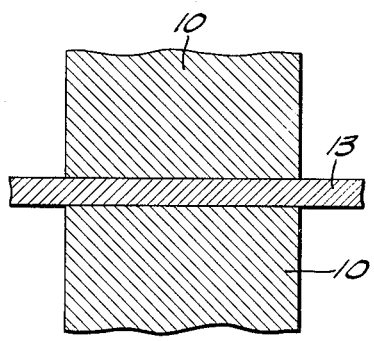
FIGURE 3 is an enlarged fragmentary vertical sectional view showing a pair of bars with a shim disposed therebetween and prior to the welding operation.
Figure 5:
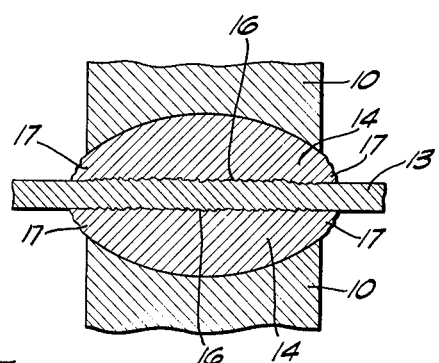

FIGURE 4 corresponds to FIGURE 3 but shows the heat-affected zone present during welding; and FIGURE 5 corresponds to FIGURE 3 but shows the condition of the parts after completion of the welding operation.

Referring to the drawing, a pair of bar or rod ends 10 are shown as mounted parallel and adjacent to each other, and as clamped between the generally rectangular electrodes 11 of a suitable resistance welding apparatus, not shown. The bar ends 10 are integral with bars, not shown, which it is desired to series connect in zigzag relationship as above indicated. The complete bars, and the fixture for holding the same in position during welding, are shown in the above-cited co-pending application Serial No. 541,862. Electrodes 11 are mounted on the horns, shown fragmentarily at 12, of the above-indicated unshown resistance welding apparatus. It is to be understood that the welding apparatus itself may be of any suitable type capable of carrying out the functions to be described subsequently. Suitable resistance welding machines are manufactured by the Acme Electric Welder Company of Los Angeles, California.

A shim 13, formed of steel as are the bar ends 10, is disposed between the bar ends 10 and is adapted to diffuse and bond with the bar ends during the welding operation. The shim 13 is preferably employed in the form of a strip mounted transversely of the bar pairs to be welded, and extending between the bar ends of a number of bar end pairs as set forth in the cited application Serial No. 541,862.

Figure 1:
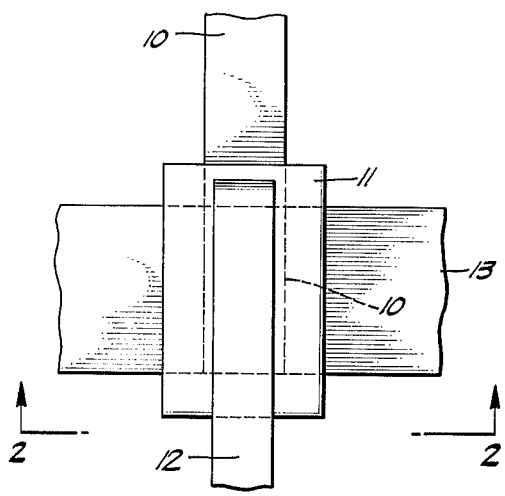
FIGURE 1 is a fragmentary plan view showing one form of apparatus for carrying out the method of the invention.
Figure 2:
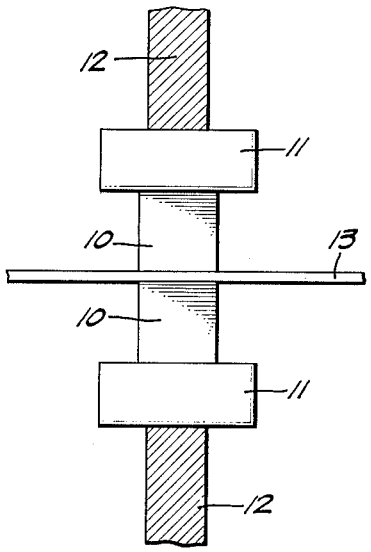
FIGURE 2 is a fragmentary vertical sectional view taken along line 2—2 of FIGURE 1 and as viewed in the direction of the arrows.

Before describing the important dimensions, materials, voltages, currents, times and other variables which fall within the scope of the method of the invention, a brief description will be given of the overall method. The unshown bars are held in the fixture set forth in the cited copending application Serial No. 541,862, so that their ends 10 are parallel and adjacent each other as shown in FIGURES 1 and 2. The shim strip 13 is then inserted between the bar ends 10, and the resistance welding machine is operated so that the horns 12 clamp the electrodes 11 against the outer surfaces of the bar ends 10 as illustrated. The shim 13 is thus clamped between the bar ends 10 as shown in fragmentary enlarged form in FIGURE 3.

Upon application of the welding voltage, current flows from horn 12 through the adjacent electrode 11 and bar end 10 and then through the shim 13 and the other bar end 10, electrode 11 and horn 12. A very large amount of heat is thus generated, primarily at the interfaces between shim 13 and bar ends 10, to result in the formation of heat-affected zones as indicated at 14 in FIGURES 4 and 5. The metal in such heat-affected zones 14 may become molten, but does not act the same as the metal in a "nugget" formed during conventional spot welding operations. It is to be noted that in FIGURE 4 the planes of separation between shim strip 13 and bar ends 10 are still relatively sharp, since the welding operation is not as yet approaching completion.

Referring to FIGURE 5, which shows the condition of the elements after completion of welding, it is emphasized that the planes or lines 16 of separation between shim 13 and bar ends 10 have become extremely fuzzy and poorly defined, a very considerable amount of diffusion having taken place between the metal of the bar ends and the metal of shim 13. Furthermore, a small amount of extrusion of metal from heat-affected zone 14 has occurred transversely of the bar ends and along shim 13 to result in the formation of upset portions indicated at 17. However, there is absolutely no distortion, upsetting or crushing present at any other portion of the bar ends 10, so that upon removal of the upset portions 17 and cutting off of the shim strip 13 the welded bar ends will be perfectly rectangular in section as desired.

The amount of upset 17 is substantially equal to the amount of metal introduced by the use of the shim 13, so that that the cross-sectional dimensions of the welded bar ends 10 will be the same after welding as before welding. Thus, if each unwelded bar end is one-quarter inch square in section, the longest cross-sectional dimension of the welded bars will be one-half inch, the added metal introduced by shim 13 having been compensated for by the loss of metal in the upsets 17.

Proceeding next to a description of the various important factors entering into the welding methods, the bars 10 are formed of commercial steel and are not annealed prior to welding. Preferably, the bars 10 are formed of S.A.E. 1020 cold rolled carbon steel and are one-quarter of an inch square in cross-sectional dimension. Prior to welding, the bar ends 10 are cleaned by a hot pickling process involving the use of concentrated commercial hydrochloric acid, hydrogen peroxide and water. After pickling, the bar ends are dipped in a light oil to prevent oxidation prior to welding.

The shim 13 is formed of commercial steel strip, either carbon or stainless steel. A preferred steel is S.A.E. 1010 steel strip. Relative to shim dimensions, the preferred width is one-half inch, and the preferred thickness .015 inch. The thickness of the sim is particularly important, relative to the spurting or jetting of molten metal and relative to other factors, the critical range of thicknesses being between about .015 and about .018 inch. The shim should be clean when welded, and is preferably subjected to a hot pickling treatment such as was set forth above relative to the bar ends 10.

The electrodes 11 are preferably formed of copper or the like, and are rectangular in shape as illustrated. As shown in FIGURES 1 and 2, the electrodes 11 should be sufficiently large to lap over the entire weld area, being both wider than the strip 13 and the bar ends 10.

The welding pressure should be uniformly held at a value of between 15,000 and 30,000 pounds per square inch, a pressure of 24,000 pounds per square inch being preferred. Thus, with the illustrated shim strip being one-half inch wide, and the bar ends being one-quarter inch wide, the illustrated weld would have a cross-sectional area at each interface of one-eighth square inch. Accordingly, in the illustrated example, the total pressure applied between horns 12 would range from 1,875 pounds to 3,750.

The voltage employed in practicing the method of the invention is reltively high as compared to projection welding voltages, for example, the range being from 12 to 16 volts. Preferably, commercial 60 cycle singe-phase alternating voltage is employed, it having been found that single-phase is easier to employ, and generally produces more satisfactory results, than three-phase.

The current value is also relatively high, from 7,000 to 10,000 amperes being employed for the one-eighth square inch interface area of the described example. Stated otherwise, from 56,000 to 80,000 amperes per square inch are passed through the interfaces between shim 13 and the bar ends 10.

The weld time is relatively short, from seven to ten cycles of 60 cycle current. This weld time is so short that the weld heat does not have sufficient time to be transmitted along the shim 13, or through space, from one pair of bar ends 10 to the adjacent pair. This is extremely desirable since it prevents oxidation of unwelded pairs of bar ends 10 by welding heat generated during welding of an adjacent pair.

The hold time is preferably 20 cycles of 60 cycle current. The hold time may, however, vary within wide limits so long as it is at least as long as the weld time.

To summarize the method of the invention, the bars (bar ends 10) are first hot pickled and oiled, as previously described, as is the shim strip 13. The bars and shim strips are then placed in the welding jig as set forth in the cited application, Serial No. 568,420. The shim strip 13 is then positioned as illustrated, and the horns 12 and electrodes 11 are positioned as shown relative to the bars 10 and shim strip 13. The described clamping pressure is then applied and the described welding current at the described voltage is passed through the interfaces between shim strip 13 and bar ends 10. As above stated, this first results in formation of the heat-affected zone 14, and then is extrusion or upsetting of the portions 17 and in formation of the fuzzy or diffused planes or lines (shown in FIGURE 5) between shim strip 13 and the bar ends 10. An extremely strong weld is thus produced in a very short period of time, and without excessive upsetting, spatter or heat transmission to adjacent pairs of bar ends. After the making of a weld as indicated, the welding process is repeated for the next adjacent pair of bar ends. This is continued until the hinge welds have been made to series-connect all of the bars in zigzag relationship.

The connected bars are then removed from the fixture and the excess shim material between the bar ends is sheared off. The sides of the joints between the bar ends 10 are then ground to make them flush with the central portions of the bars, it being understood that the longest cross-sectional dimension of the welded bars is twice that of the unwelded bars as previously stated. Also, there is no crushing or distortion such as is conventional in resistance welding, and the welds occur clear to the edges of the bars as desired. The zigzag bank of welded bars is then installed in an annealing jig and annealed in an inert atmosphere. Finally, the ends of the bars 10 are milled off to finished length and the bank of rods is formed into a semi-circular warhead section as set forth in the cited application Serial No. 568,420.

While the particular method herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. That improved method of electrically welding steel members of small cross section together under high pressure without substantial change in the dimensions of the members due to welding pressures and temperatures, said method comprising interposing a thin shim between the surfaces of the steel members to be welded together, said shim being of substantially the same steel as the members being welded together, applying pressure to said members to compress said shim from the opposite sides thereof under a pressure ranging between 15,000 to 30,000 pounds per square inch, flowing an electric current having a density of 56,000 to 80,000 amperes per square inch through said members and through said shim for a fraction of a second, whereby the contacting surfaces at said shim fuse together and fluxion of said shim occurs, and thereafter discontinuing the application of pressure to said members.

2. That method defined in claim 1, in which said shim has a uniform thickness of from .015 to .018 inch.

3. That method defined in claim 1, in which voltage is applied for a period of 7 to 10 cycles.

4. That method defined in claim 1 including the step of hot pickling said members prior to said welding operation.

5. That method defined in claim 1 including the step of annealing the resultant welded joint subsequent to said welding operation.

6. That method defined in claim 1 including the step of discontinuing the current flow while holding the members compressed together for a brief additional interval after termination of current flow not substantially greater than the interval of welding current flow.

7. That method defined in claim 1 including the step of continuing the application of pressure to said members until a quantity of metal equivalent to the volume of the shim located between the members being welded has been squeezed laterally from between said members in the area immediately adjacent the fused juncture of said members.

8. That method defined in claim 1 wherein an elongated shim is inserted between the members to be joined by welding with the longer dimension of the shim extending transversely of the length of the members being welded whereby one dimension of said welded junction is determined by the width of said shim.

9. That method defined in claim 1 wherein area of the welded juncture between said members is determined by the surface area of said shim in pressure contact with surface areas of the members being joined together.

10. That method defined in claim 1, in which a sixty cycle single-phase alternating voltage of from 12 to 16 volts is applied between said electrodes in order to produce said welding current.

References Cited by the Examiner

UNITED STATES PATENTS

| | | | |
|---|---|---|---|
| Re. 15,466 | 10/1922 | Murray | 219—117 |
| 616,436 | 12/1898 | Kleinschmidt | 219—117 |
| 1,278,193 | 9/1918 | Murray | 219—117 |
| 1,973,972 | 9/1934 | Allan | 219—117 |
| 2,021,119 | 11/1935 | Tinkham | 219—117 |
| 2,487,462 | 11/1949 | Meyer | 219—117 |
| 2,544,335 | 3/1951 | Linnert | 219—91 |

RICHARD M. WOOD, *Primary Examiner.*

ARTHUR M. HORTON, SAMUEL BOYD, *Examiners.*